(12) United States Patent
Machida et al.

(10) Patent No.: US 9,669,745 B2
(45) Date of Patent: Jun. 6, 2017

(54) MAT FASTENER

(71) Applicants: Piolax, Inc., Yokohama-shi (JP); HONDA MOTOR CO., LTD., Tokyo (JP)

(72) Inventors: Kazunori Machida, Yokohama (JP); Toru Ohba, Wako (JP); Tatsuya Shiono, Wako (JP)

(73) Assignees: PIOLAX, INC., Yokohama-Shi, Kanagawa (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/368,484

(22) PCT Filed: Nov. 12, 2012

(86) PCT No.: PCT/JP2012/007236
§ 371 (c)(1),
(2) Date: Jun. 24, 2014

(87) PCT Pub. No.: WO2013/099088
PCT Pub. Date: Jul. 4, 2013

(65) Prior Publication Data
US 2014/0373314 A1 Dec. 25, 2014

(30) Foreign Application Priority Data
Dec. 27, 2011 (JP) .................. 2011-286559

(51) Int. Cl.
*B60N 3/04* (2006.01)
*F16B 2/02* (2006.01)
(Continued)

(52) U.S. Cl.
CPC ............... *B60N 3/046* (2013.01); *F16B 2/02* (2013.01); *F16B 2/12* (2013.01); *F16B 5/065* (2013.01);
(Continued)

(58) Field of Classification Search
CPC .......... F16B 2/02; F16B 21/04; F16B 5/0692; F16B 2/12; F16B 5/065; B60N 3/046; Y10T 24/346
See application file for complete search history.

(56) References Cited

U.S. PATENT DOCUMENTS 4,250,599 A * 2/1981 Nagashima ........... F16B 5/0628
24/326
6,497,003 B2 * 12/2002 Calabrese .............. B60N 3/046
16/4

(Continued)

FOREIGN PATENT DOCUMENTS

CN 101918244 A 12/2010
CN 201890175 U 7/2011
(Continued)

OTHER PUBLICATIONS

International Search Report (ISR) (PCT Form PCT/ISA/210), in PCT/JP2012/007236 dated Dec. 11, 2012.

*Primary Examiner* — Robert J Sandy
*Assistant Examiner* — Louis Mercado
(74) *Attorney, Agent, or Firm* — McGinn IP Law Group, PLLC

(57) ABSTRACT

In a mat fastener for preventing a mat disposed on a carpet provided on a vehicle body panel from moving, a first fixing member is fixed to the carpet. A second fixing member is fixed to the mat. An operational mounting member is arranged to mount the second fixing member to the first fixing member. The first fixing member includes a supporting portion arranged to support the operational mounting member, and an engaging portion arranged to hold the second fixing member. The second fixing member includes a locked portion arranged to be locked on the operational mounting member, and an engaged portion arranged to be engaged with the engaging portion in a state where the (Continued)

second fixing member is mounted to the first fixing member by the operational mounting member.

15 Claims, 11 Drawing Sheets

(51) Int. Cl.
    *F16B 2/12*     (2006.01)
    *F16B 21/04*     (2006.01)
    *F16B 5/06*     (2006.01)

(52) U.S. Cl.
    CPC ............ *F16B 5/0692* (2013.01); *F16B 21/04* (2013.01); *Y10T 24/346* (2015.01)

(56) References Cited

U.S. PATENT DOCUMENTS

| | | | | |
|---|---|---|---|---|
| 7,546,661 B2 * | 6/2009 | Connor, Jr. | ............ | B60N 3/046 16/4 |
| 7,945,992 B2 * | 5/2011 | Parisi | ............ | B60N 3/046 16/4 |
| 8,245,368 B2 * | 8/2012 | Park | ............ | B60N 3/046 16/4 |
| 8,375,514 B2 * | 2/2013 | Dendo | ............ | B60N 3/046 16/4 |
| 8,882,171 B2 * | 11/2014 | Goto | ............ | B60N 3/046 16/4 |
| 8,931,162 B2 * | 1/2015 | Gonzalez | ............ | B60N 3/042 16/4 |
| 9,199,567 B1 * | 12/2015 | Kaufman | ............ | B60N 3/046 |
| 2007/0011844 A1 | 1/2007 | Aoki et al. | | |
| 2010/0287748 A1 * | 11/2010 | Courtin | ............ | B60N 3/046 24/700 |
| 2014/0373314 A1 * | 12/2014 | Machida | ............ | B60N 3/046 24/351 |

FOREIGN PATENT DOCUMENTS

| | | |
|---|---|---|
| JP | 62-75775 | 5/1987 |
| JP | 2007-22299 A | 2/2007 |
| JP | 2008-163961 A | 7/2008 |
| JP | 2010-180929 A | 8/2010 |
| WO | WO 2011/033482 A1 | 3/2011 |

* cited by examiner

MAT FASTENER

TECHNICAL FIELD

The present invention relates to a mat fastener for preventing a mat disposed on a floor of a vehicle from moving.

BACKGROUND ART

A mat is laid below a driver's seat or a passenger's seat of a vehicle. The mat is disposed on a carpet attached to a vehicle body panel. Patent Document 1 discloses a carpet fastener that includes a main body mounted to a carpet by a screw, a long mounting hole provided to a mat, and a rotating lid that intersects with the mounting hole to mount the mat to the main body. A rectangular column protruding upward is provided to the main body of the carpet fastener, and the rotating lid is rotatably supported by the distal end of the rectangular column The rotating lid is slightly smaller than the mounting hole of the mat, and the mat is mounted to the main body such that a user inserts the rotating lid into the mounting hole of the mat and rotates the rotating lid to make the rotating lid intersect with the mounting hole.

CITATION LIST

Patent Literature

Patent Document 1

JP-UM-S62-075775-A

SUMMARY OF THE INVENTION

Problem that the Invention is to Solve

In the technique of Patent Document 1, if the rotating lid is rotated 90 degrees by an unintentional external force even though the mat is mounted to the main body of the carpet fastener, the rotating lid is made insertable into the mounting hole of the mat, which could cause the mat to be disposed at a fixation-releasing position.

The present invention is made in view of the above problem, and an object of the present invention is to provide a mat fastener capable of preventing the possibility that a mat is disposed at a fixation-releasing position even if locking by an operational mounting member is released.

Means for Solving the Problem

To solve the above-described problem, one embodiment of the present invention provides a mat fastener for preventing a mat disposed on a carpet provided on a vehicle body panel from moving, the mat fastener including: a first fixing member fixed to the carpet; a second fixing member fixed to the mat; and an operational mounting member configured to mount the second fixing member to the first fixing member. The first fixing member includes a supporting portion configured to support the operational mounting member, and an engaging portion configured to hold the second fixing member. The second fixing member includes a locked portion configured to be locked on the operational mounting member, and an engaged portion configured to be engaged with the engaging portion in a state where the second fixing member is mounted to the first fixing member.

According to the present embodiment, the second fixing member fixed to the mat can be fixed to the first fixing member at two positions of locking by the operational mounting member and engagement by the engaging portion. Thus, even in case the locking by the operational mounting member is released, the engagement by the engaging portion can prevent the second fixing member from being dismounted.

Advantageous Effects of Invention

According to the present invention, in the mat fastener, the possibility that a mat is disposed at a fixation-releasing position can be prevented even if locking by an operational mounting member is released.

MODE FOR CARRYING OUT THE INVENTION

Figure 1A:
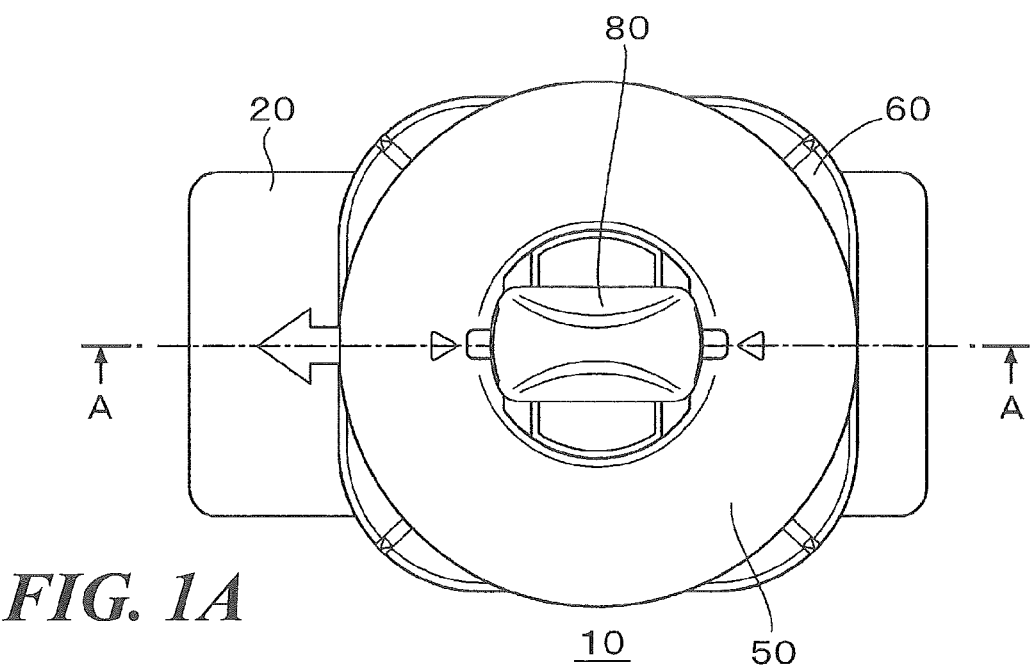
FIG. 1A is a top view of a mat fastener according to an embodiment of the present invention.
Figure 1B:
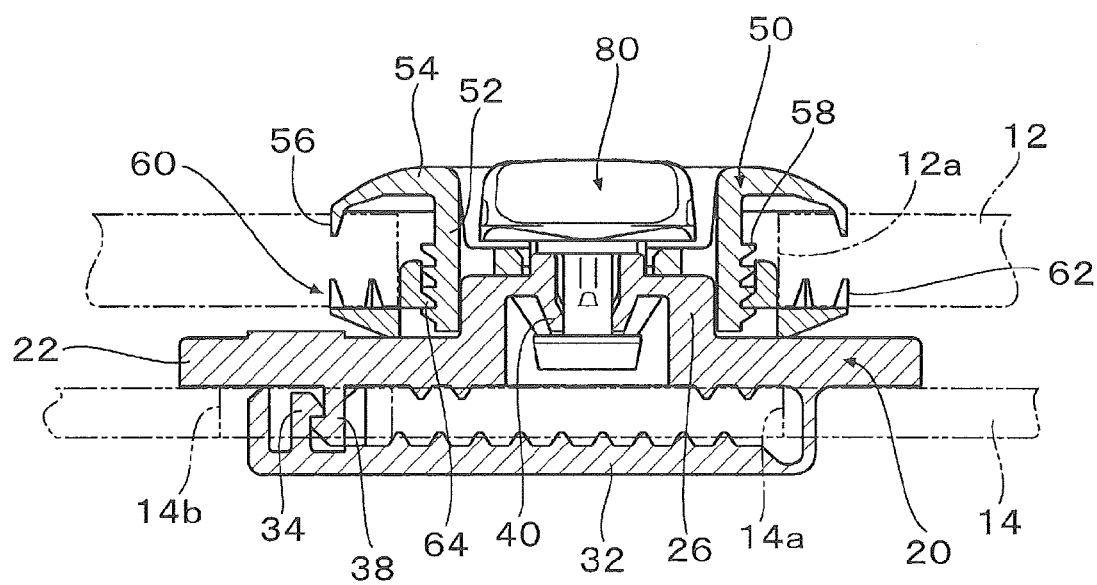
FIG. 1B is a cross-sectional view of the mat fastener taken along the line A-A of FIG. 1A.

FIG. 1A is a top view of a mat fastener 10 according to an embodiment of the present invention, and FIG. 1B is a cross-sectional view of the mat fastener 10 taken along the line A-A of FIG. 1A. FIG. 1B shows the state where the mat fastener 10 is mounted to a mat 12 and a carpet 14.

The carpet 14 is made of fabric, and attached to a vehicle body panel below a driver's seat or a passenger's seat. The mat 12 is disposed on the carpet 14 in a cabin floor. The mat fastener 10 is mounted to a vehicle body in order to prevent the mat 12 from moving. Plural mat fasteners 10 may be mounted with respect to one mat 12. According to the mat fastener 10, the mat 12 can be prevented from moving to be entangled with a brake pedal or an accelerator pedal.

The mat fastener 10 includes a first fixing member 20 fixed to the carpet 14, a second fixing member fixed to the mat 12, and an operational mounting member 80 arranged to mount the second fixing member to the first fixing member 20. As shown in FIG. 1B, the second fixing member includes an top-side second fixing member 50 fixed to the top side of the mat 12, and a back-side second fixing member 60 fixed to the back side of the mat 12. The direction in which the mat 12 and the carpet 14 face with each other is same as the axial direction of the operational mounting member 80. This direction is hereinafter referred to simply as the axial direction. The components of the mat fastener 10 will be described below referring to the following drawings.

Figure 2A:
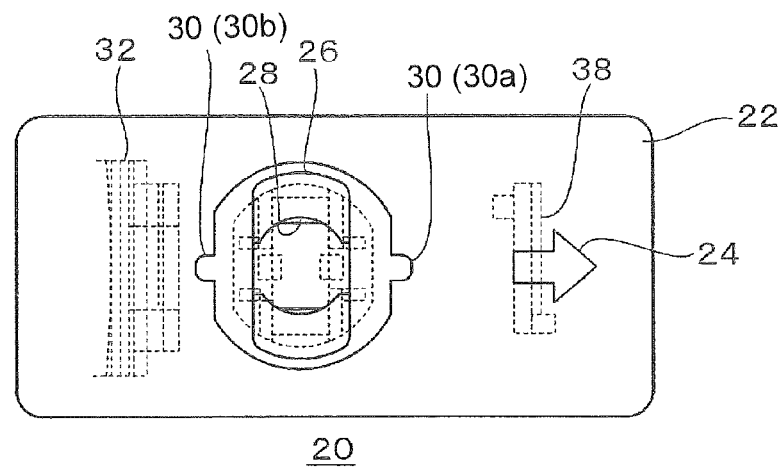
FIG. 2A is a top view of a first fixing member.
Figure 2B:
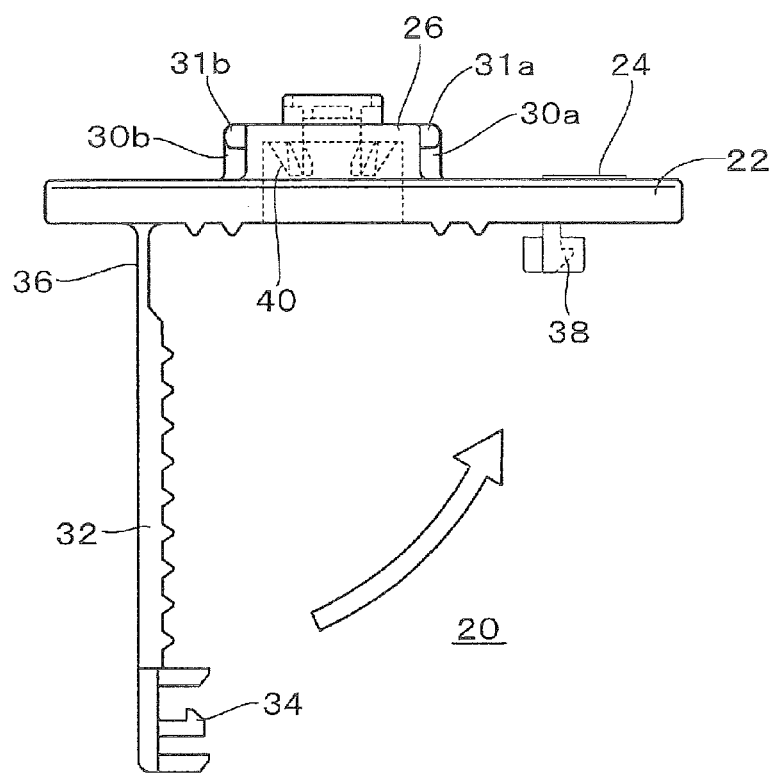
FIG. 2B is a side view of the first fixing member.
Figure 3:
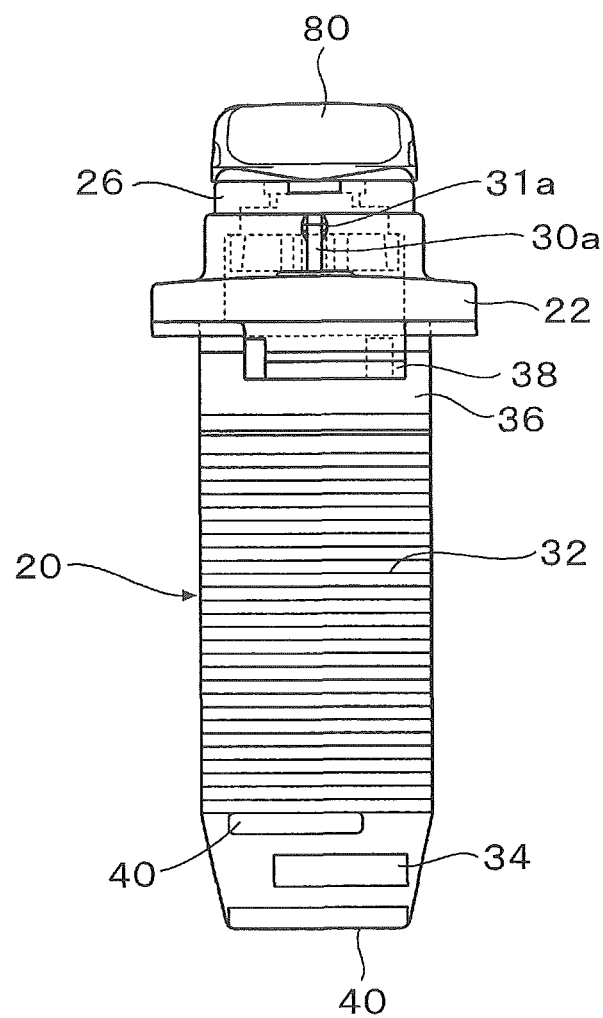
FIG. 3 is a front view of the first fixing member in a state where an operational mounting member is mounted thereto.

FIG. 2A is a top view of the first fixing member 20, and FIG. 2B is a side view of the first fixing member 20. FIG. 3 is a front view of the first fixing member 20 in a state where the operational mounting member 80 is mounted thereto. The first fixing member 20 includes a main body portion 22 having a plate shape, a supporting portion 26 including an insert hole 28, a connected portion 32 provided on the back side of the main body portion 22, and a connecting portion 38 to which the connected portion 32 is connected.

As shown in FIG. 2A, the main body portion 22 includes on its surface a positioning portion 24 indicating a mounting direction of the first fixing member 20. The first fixing member 20 is fixed to the carpet 14 so that the direction indicated by the arrow of the positioning portion 24 is oriented to the front of the vehicle.

The supporting portion 26 has a cylindrical shape, and protrudes on the surface side of the main body portion 22. In the center of the supporting portion 26, the insert hole 28 for the operational mounting member 80 is provided. A front engaging portion 30a and a rear engaging portion 30b (which may be collectively referred to as the "engaging portions 30") facing with each other are provided to the outer periphery of the supporting portion 26. The engaging portions 30 define convex portions protruding from the outer wall of the supporting portion 26 in the radial direction. The convex portions have a rib shape of extending in the axial direction. As shown in FIG. 3, the front engaging portion 30a includes a bulging portion 31a at its upper end, and it is also true in the rear engaging portion 30b. The supporting portion 26 includes a limiting portion 40 which limits the movement of the operational mounting member 80 on the inner side of the supporting portion 26.

The connected portion 32 and the connecting portion 38 are provided on the back side of the main body portion 22, and each include hooks at their tip ends. The connected portion 32 includes a hinge portion 36 so as to be rotatable therearound. The connecting hook 34 is provided to the tip end of the connected portion 32 so as to be connected with the hook of the connecting portion 38.

As shown in FIG. 1B, the connected portion 32 and the connecting portion 38 are respectively inserted into a carpet hole 14a and a carpet hole 14b, connected to each other on the back side of the carpet 14, and fix the first fixing member 20 to the carpet 14.

Figure 4A:
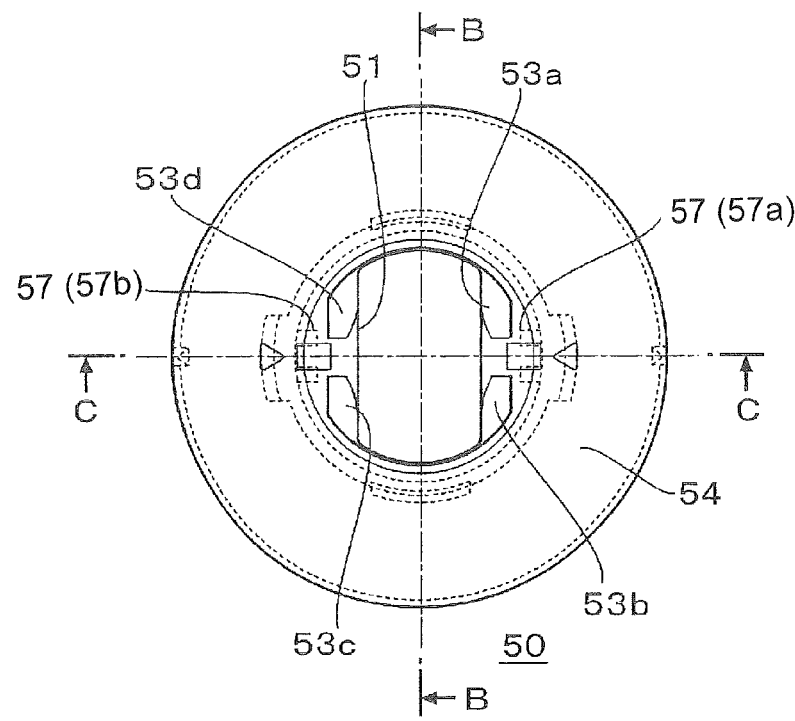
FIGS. 4A to 4C are explanatory views for illustrating a top-side second fixing member.
Figure 4B:
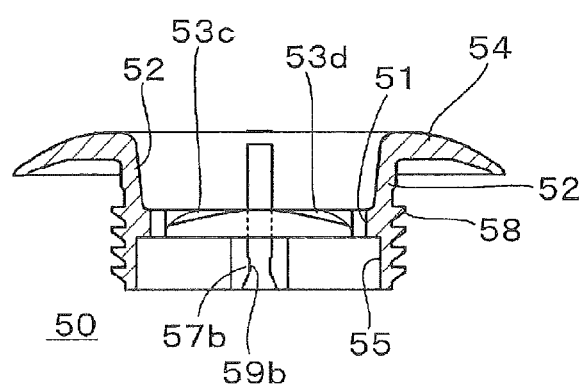
Figure 4C:
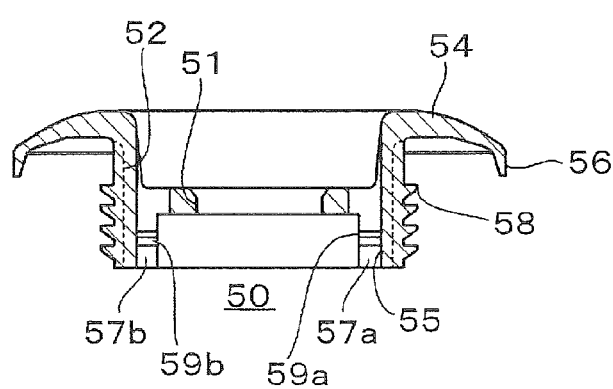
Figure 5A:
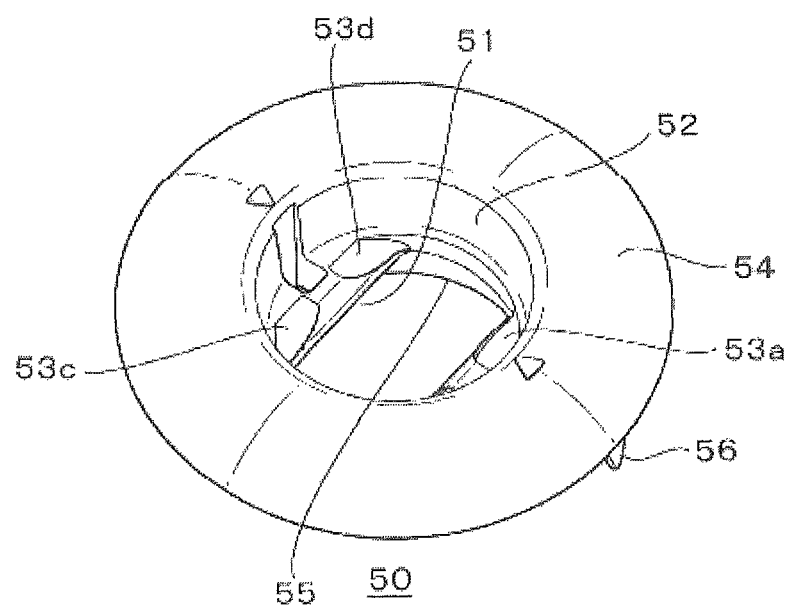
FIGS. 5A and 5B are perspective views of the top-side second fixing member.
Figure 5B:
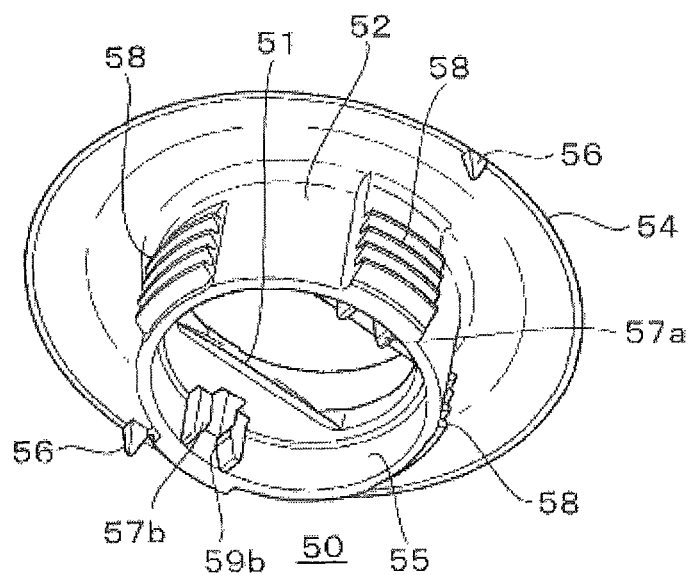

FIGS. 4A to 4C are explanatory views for illustrating the top-side second fixing member 50. FIG. 4A is a plan view of the top-side second fixing member 50. FIG. 4B is a cross-sectional view of the top-side second fixing member 50 taken along the line B-B of FIG. 4A. FIG. 4C is a cross-sectional view of the top-side second fixing member 50 taken along the line C-C of FIG. 4A. FIG. 5A is a perspective view of the top-side second fixing member 50 seen from the top side. FIG. 5B is a perspective view of the top-side second fixing member 50 seen from the back side.

The top-side second fixing member 50 includes a barrel portion 52 having a cylindrical shape, a flange portion 54 extending in the radial direction from one end of the barrel portion 52, and a hole-rim portion 51 provided on the inside of the barrel portion 52, the hole-rim portion 51 having an inner periphery of an approximately rectangular shape, that is, having a long hole shape.

As shown in FIG. 4A, the hole-rim portion 51 forms long sides of the inner periphery and overhangs from the inner periphery of the barrel portion 52. As shown in FIGS. 4A and 5A, a first tapered guiding surface 53a, a second tapered guiding surface 53b, a third tapered guiding surface 53c, and a fourth tapered guiding surface 53d (which may be collectively referred to as the "tapered guiding surfaces 53") are provided on the upper surface of the hole-rim portion 51. As shown in FIG. 4B, the tapered guiding surfaces 53 have the shape of being raised at the middle sections of the long sides, and are inclined to be lowered from the middle sections along the long sides toward the corner sections. That is, the tapered guiding surfaces 53 are each provided at the four corners of the hole-rim portion 51 having the approximate rectangular shape.

As shown in FIGS. 4B and 4C, the barrel portion 52 includes plural outer peripheral step portions 58 formed around its periphery. Two engaged portions 57a and 57b (which may be collectively referred to as the "engaged portions 57") facing with each other are provided on an inner periphery 55 of the barrel portion 52.

As shown in FIG. 4B, the engaged portion 57b defines a concave portion to be attached to the convex portion of the engaging portion 30. As shown in FIG. 5B, the concave portion has a trench formed by a pair of raised portions provided to the inner periphery of the barrel portion 52, the raised portions protruding in the radial direction and extending in the axial direction. That is, the convex portion fits into the trench between the pair of raised portions. The engaged portion 57b includes a narrow clearance portion 59b that is smaller in trench width than the other portions. That is, at the narrow clearance portion 59b, the distance between the pair of facing raised portions becomes smaller. Because the convex portions and the concave portions extend in the axial direction, even if a user steps on the mat fastener 10 from above, a problem due to the deformations of the rib-shaped convex portions and the concave portions formed by the raised portions may not be caused.

Figure 5C:
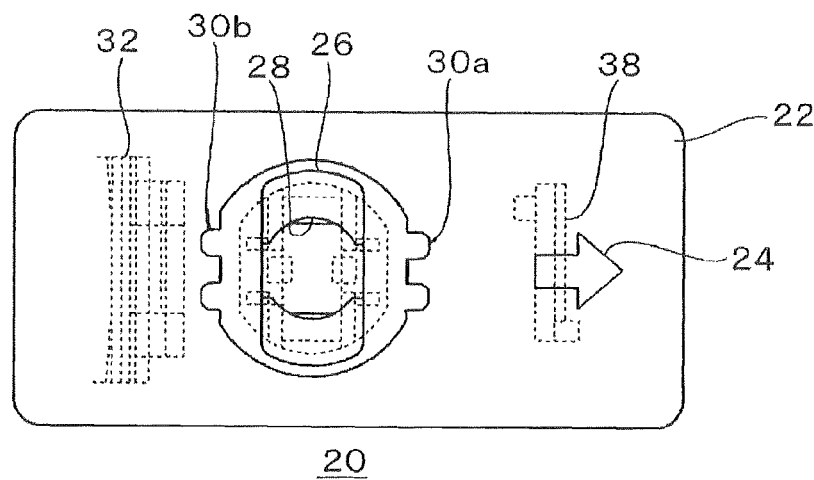
FIG. 5C illustrates a concave portion provided as an engaging portion.
Figure 5D:
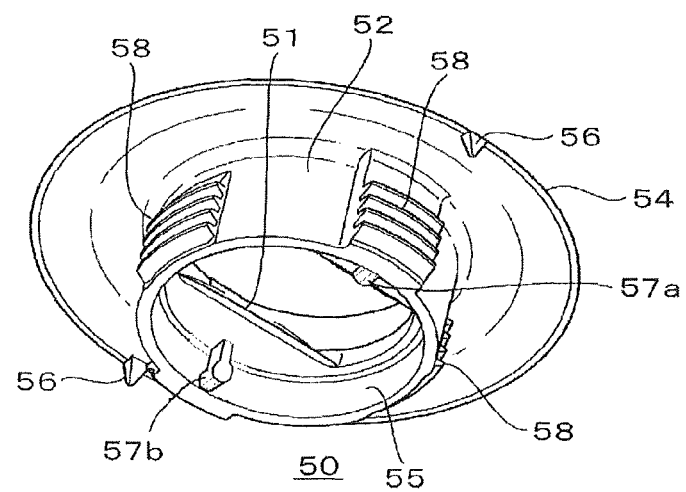
FIG. 5D illustrates a convex portion provided as an engaged portion.

While the above embodiment exemplifies the case where the convex portions are provided as the engaging portions 30 to the first fixing member 20 and where the concave portions are provided as the engaged portions 57 to the second fixing member 50, the present invention is not limited hereto. For example, concave portions may be provided as the engaging portions 30a, 30b, as illustrated, for example, in FIG. 5C, and convex portions may be provided as the engaged portions 57a, 57b, as illustrated, for example, in FIG. 5D. While the above embodiment exemplifies the case where the convex portions and the concave portions respectively have the ribs and the raised portions sandwiching the ribs, the present invention is not limited hereto. As long as the movement of the second fixing member can be limited through the engagement between the convex portions and the concave portions, the convex portions and the concave portions may have other shapes.

As shown in FIG. 4C, the flange portion 54 includes on its outer peripheral edge plural top-side hooks 56 that bites into the mat 12. Hereinafter, a description of the back-side second fixing member 60 will be provided referring to FIG. 1B.

The back-side second fixing member 60 has a ring shape, and includes a back-side hook 62 provided on the outer edge in the radial direction, and an inner peripheral step portion 64 protruding inward in the radial direction from the inner periphery. The back-side hook 62 bites into the back surface of the mat 12.

Figure 6A:
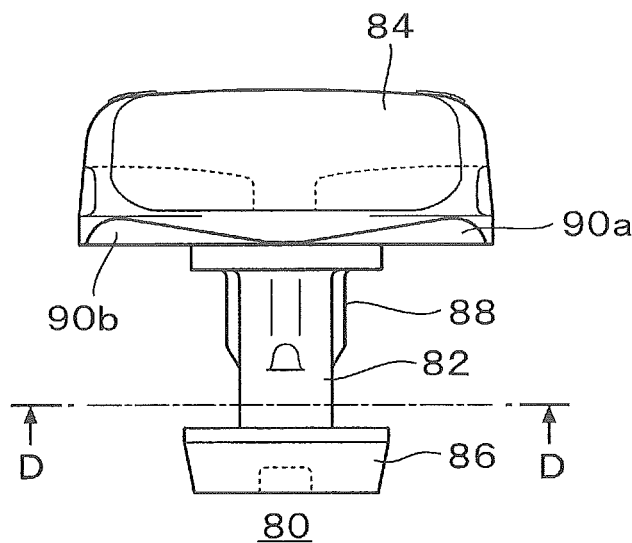
FIG. 6A is a side view of the operational mounting member seen in a first direction.
Figure 6B:
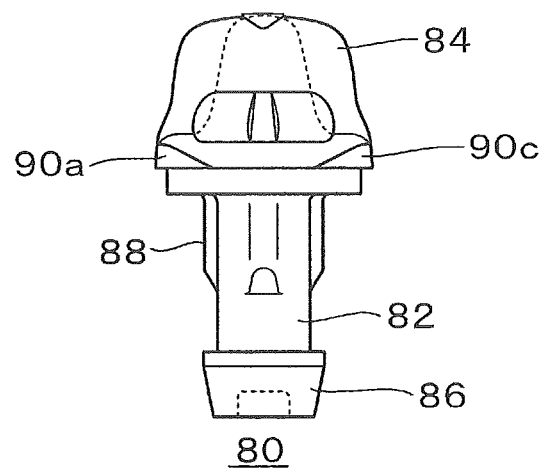
FIG. 6B is a side view of the operational mounting member seen in a second direction perpendicular to the first direction.
Figure 6C:
FIG. 6C is a cross-sectional view of an shaft portion taken along the line D-D of FIG. 6A.

FIG. 6A is a side view of the operational mounting member 80 seen in a first direction. FIG. 6B is a side view of the operational mounting member 80 seen in a second direction perpendicular to the first direction. FIG. 6C is a cross-sectional view of a shaft portion 82 taken along the line D-D of FIG. 6A. The operational mounting member 80 includes the shaft portion 82 having a rod shape, an operating knob portion 84 provided to one end of the shaft portion 82, and an expanding portion 86 provided to the other end of the shaft portion 82.

As shown in FIG. 6C, the shaft portion 82 has an approximate rectangular sectional shape, and includes four flange portions 88 on the outer periphery that are disposed uniformly in the circumferential direction. When the operational mounting member 80 is rotated, the corners of the shaft portion 82 expand to open the limiting portion 40. With the operational mounting member 80 being further rotated, the limiting portion 40 reduces in diameter, which makes the flat portions of the shaft portion 82 and the limiting portion 40 contact together to be held. Thus, when rotating the operational mounting member 80 supported by the first fixing member 20, this gives a user a click feeling.

The operating knob portion 84 and the expanding portion 86 have outer peripheries of an approximate rectangular shape with elongating outward in the radial direction from the shaft portion 82. A first tapered guiding surface 90a, a second tapered guiding surface 90b, a third tapered guiding surface 90c, and a fourth tapered guiding surface 90d (which may be collectively referred to as the "tapered guiding surfaces 90") are provided on the lower surface of the operating knob portion 84. The tapered guiding surfaces 90 define four corners of the lower surface of the operating knob portion 84 that are formed into a tapered shape. The second fixing member can be mounted to the first fixing member 20 by rotational operation of the operating knob portion 84.

As shown in FIG. 1B, the shaft portion 82 is rotatably supported by the supporting portion 26 of the first fixing member 20, and the expanding portion 86 is engaged with the limiting portion 40 of the supporting portion 26 to limit the movement of the operational mounting member 80 in the axial direction.

Figure 7:
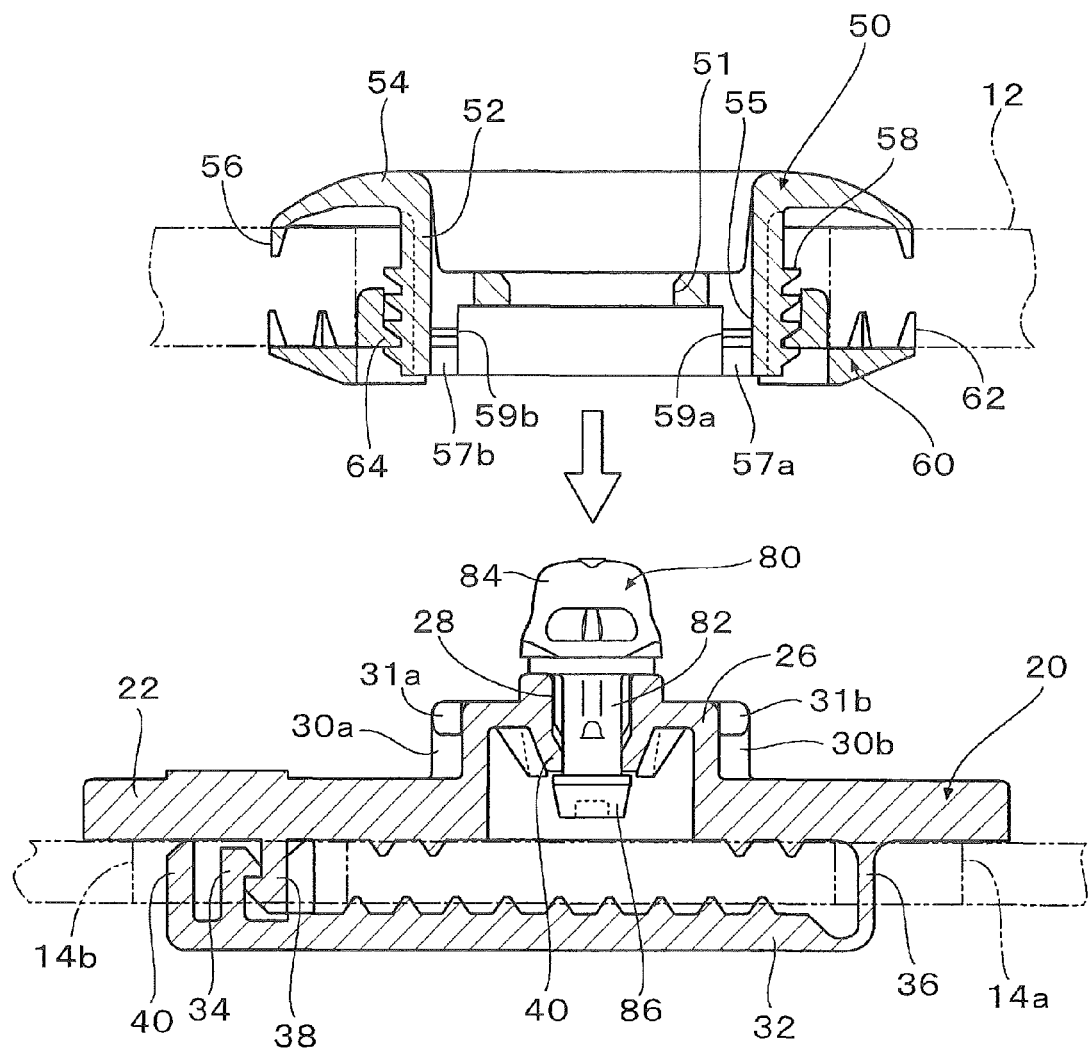
FIG. 7 is an explanatory view for illustrating a state where the second fixing member is yet to be mounted to the first fixing member.

FIG. 7 is an explanatory view for illustrating a state where the second fixing member is yet to be mounted to the first fixing member 20. The first fixing member 20 is fixed in advance to the carpet 14, and the operational mounting member 80 is rotatably supported by the first fixing member 20. First, the top-side second fixing member 50 and the back-side second fixing member 60 are coupled to each other through the engagement between the outer peripheral step portions 58 and the inner peripheral step portion 64 while sandwiching the mat 12 respectively from the top side and the back side.

Then, a user aligns the hole-rim portion 51 of the second fixing member to the operational mounting member 80, and inserts the operational mounting member 80 into the hole-rim portion 51 of the second fixing member. The direction of mounting the second fixing member to the first fixing member 20 is same as the axial direction of the operational mounting member 80.

Figure 8A:
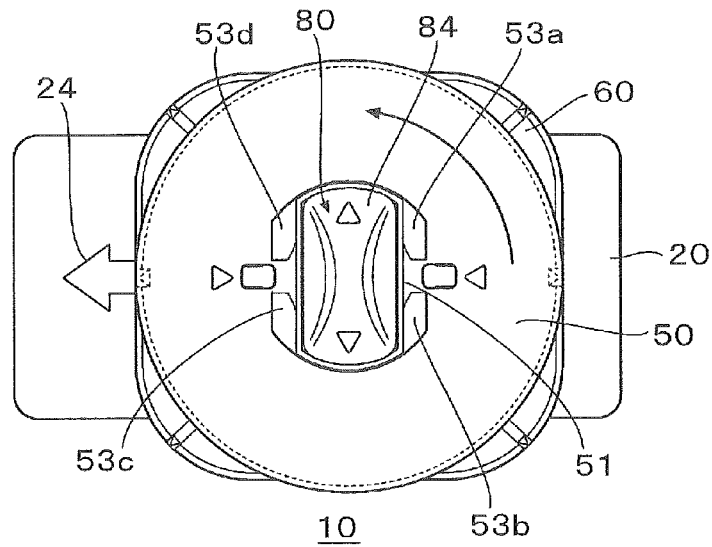
FIGS. 8A to 8C are views of the mat fastener in a state where the second fixing member is yet to be mounted to the first fixing member, and an operating knob portion is yet to be operated.
Figure 8B:
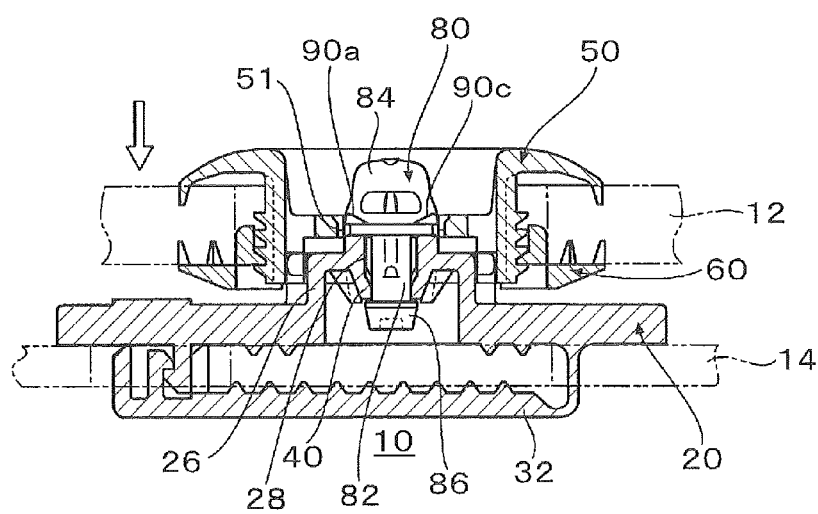
Figure 8C:
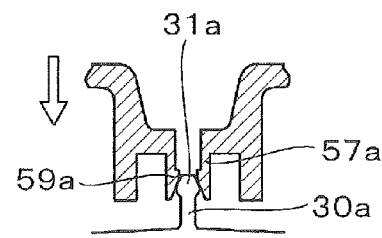

FIGS. 8A to 8C are views of the mat fastener 10 in a state where the second fixing member is yet to be mounted to the first fixing member 20, and the operating knob portion 84 is yet to be operated. FIG. 8A is a plan view of the mat fastener 10. FIG. 8B is a cross-sectional view of the mat fastener 10. FIG. 8C is a partial cross-sectional view of the mat fastener 10 and an explanatory view for illustrating the engaging portions 30 and the engaged portions 57.

As shown in FIG. 8A, the inner periphery of the hole-rim portion 51 has the shape corresponding to the outer periphery of the operating knob portion 84, and is made slightly larger than the outer periphery of the operating knob portion 84 such that the operating knob portion 84 is insertable into the hole-rim portion 51. While the operating knob portion 84 is inserted into the hole-rim portion 51, the operating knob portion 84 is yet to be rotated, and the mounting is yet to be completed in FIG. 8B.

The front engaging portion 30a is in contact with the engaged portion 57a in a state where the operating knob portion 84 is yet to be rotated in FIG. 8C. To be specific, the bulging portion 31a that is the tip end of the front engaging portion 30a is in contact with the opening of the engaged portion 57a. The rear engaging portion 30b and the engaged portion 57b are in the same state.

Figure 9A:
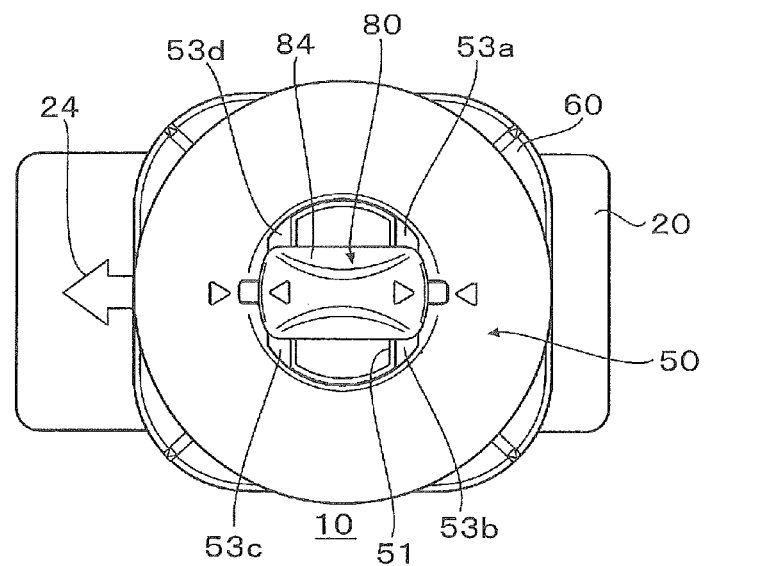
FIGS. 9A to 9C are views of the mat fastener in a state where the second fixing member is mounted to the first fixing member.
Figure 9B:
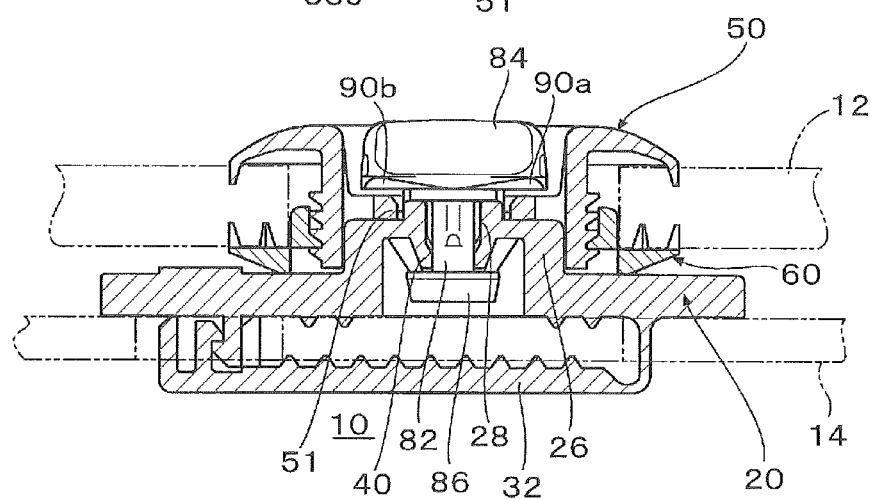
Figure 9C:
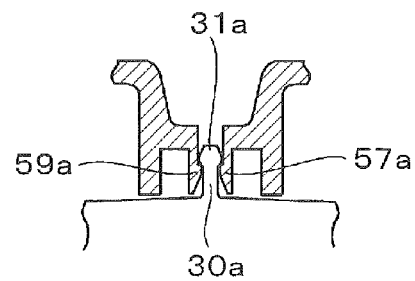

FIGS. 9A to 9C are views of the mat fastener 10 in a state where the second fixing member is mounted to the first fixing member 20. FIG. 9A is a plan view of the mat fastener 10. FIG. 9B is a cross-sectional view of the mat fastener 10. FIG. 9C is a partial cross-sectional view of the mat fastener 10 and an explanatory view for illustrating the engaging portions 30 and the engaged portions 57.

As shown in FIG. 9A, when the operating knob portion 84 is rotated 90 degrees, the operating knob portion 84 intersects with the inner periphery of the hole-rim portion 51 to be locked on the hole-rim portion 51. That is, the hole-rim portion 51 functions as a locked portion to be locked on the operational mounting member 80. This configuration can prevent the operating knob portion 84 from passing through the inner periphery of the hole-rim portion 51, which allows the second fixing member to be mounted to the first fixing member 20.

As shown in FIG. 9C, the front engaging portion 30a is engaged with the engaged portion 57a to be sandwiched by the narrow clearance portion 59b. For example, as shown in FIG. 8C, the engagement can be made by pressing the second fixing member against the first fixing member 20 in the axial direction from the state where the engaging portions 30 are in contact with the engaged portions 57. Thus, while the locking between the hole-rim portion 51 and the operational mounting member 80 can be achieved, holding of the second fixing member by the first fixing member 20 can also be achieved. Even in the case where the operating knob portion 84 being rotated and disposed at an insertable position into the inner periphery of the hole-rim portion 51 while the mat 12 is mounted to the carpet 14 by the mat fastener 10, the engagement between the engaging portions 30 and the engaged portions 57 can prevent the mat fastener 10 from being released.

A force to move the mat 12 toward the front of a vehicle may be applied from a driver or the like on the mat fastener 10. Hence, by disposing the engaging portions 30 and the engaged portions 57 at least at a front position of a vehicle, the engagement between the engaging portions 30 and the engaged portions 57 resist the force toward the front of the vehicle so as not to be easily released.

Figure 10A:
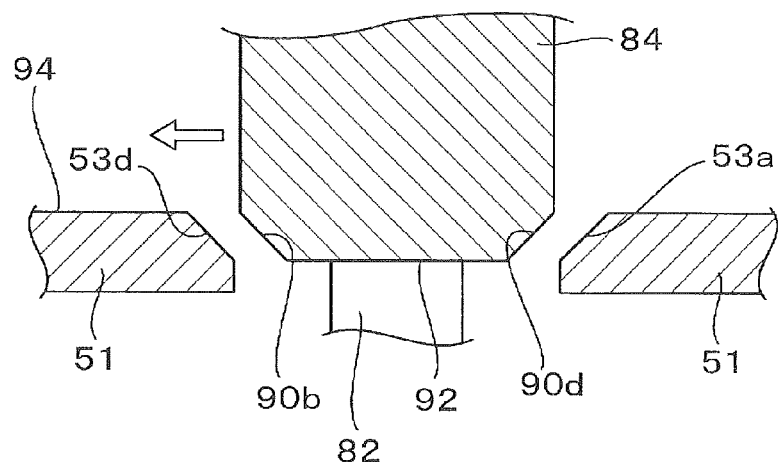
FIGS. 10A and 10B are explanatory views for illustrating the actions of tapered guiding surfaces of a hole-rim portion, and tapered guiding surfaces of the operating knob portion.
Figure 10B:
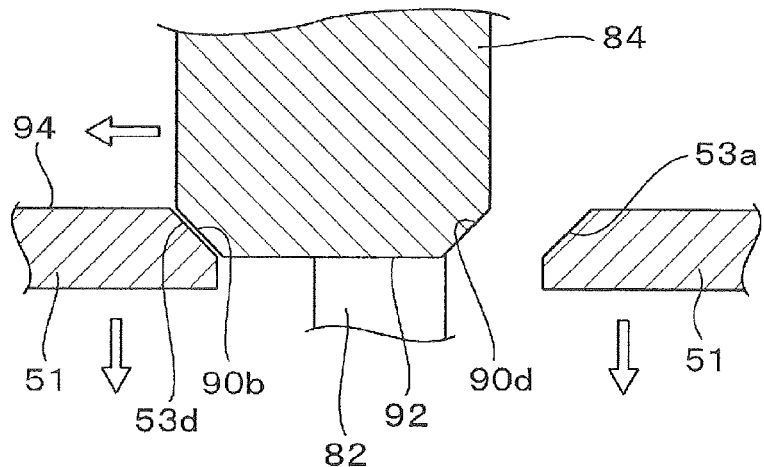

FIGS. 10A and 10B are explanatory views for illustrating the actions of the tapered guiding surfaces 53 of the hole-rim portion 51, and the tapered guiding surfaces 90 of the operating knob portion 84, and are cross-sectional views of the operating knob portion 84 and the hole-rim portion 51. FIG. 10A shows a state where the operating knob portion 84 is inserted into the inner periphery of the hole-rim portion 51 and is yet to be rotated while the engaging portions 30 are in contact with the engaged portions 57 as shown in FIG. 8C. FIG. 10B shows a state where the operating knob portion 84 is being rotated to thereby mount the second fixing member to the first fixing member 20.

To be specific, in the mat fastener 10, when the operating knob portion 84 is rotated, the tapered guiding surfaces 90 on the lower end 92 of the operating knob portion 84 are brought into contact with the tapered guiding surfaces 53 on the upper end 94 of the hole-rim portion 51, and when the operating knob portion 84 is further rotated, the operating knob portion 84 and the hole-rim portion 51 slide along the guiding surfaces to press the second fixing member toward the first fixing member 20.

The tapered guiding surfaces may be provided to at least the corner portions on the lower end of the operating knob portion 84, or the corner portions on the upper end of the hole-rim portion 51. The tapered guiding surfaces are provided to the contact surfaces on the lower end of the operating knob portion 84 and the contact surfaces on the upper end of the hole-rim portion 51. While there are four corner portions on the lower surface of the operating knob portion 84, the tapered guiding surfaces 53 may be provided to at least two diagonal corner portions. The tapered guiding surfaces 90 may be accordingly provided to diagonal corner portions.

Since the engaging portions 30 and the engaged portions 57 are respectively provided to the outer periphery of the supporting portion 26 and the inner periphery of the barrel portion 52, the engaging portions 30 and the engaged portions 57 can be disposed close to the rotational trajectory of the operating knob portion 84, which can relatively reduce the force to be applied to the operating knob portion 84 in order to press the engaged portions 57 into the engaging portions 30. Because the engagement between the engaging portions 30 and the engaged portions 57 is made at the inner position of the barrel portion 52, the possibility of the disengagement by an unintended external force can be reduced compared with the case where the engagement is made at the operating knob portion 84 that is exposed outward.

The present invention is not limited to the above-described embodiments, and modifications such as various kinds of design changes may be added to the embodiments based on the knowledge of those skilled in the art. Such modified embodiments will also fall within the scope of the present invention.

DESCRIPTION OF REFERENCE NUMERALS AND SIGNS

10 Mat fastener
12 Mat
14 Carpet
20 First fixing member
22 Main body portion
24 Positioning portion
26 Supporting portion
28 Insert hole
30a Front engaging portion
30b Rear engaging portion
31 Bulging portion
32 Connected portion
34 Connecting hook
36 Hinge portion
38 Connecting portion
40 Limiting portion
50 top-side second fixing member
51 Hole-rim portion
52 Barrel portion
53 Tapered guiding surface
54 Flange portion
56 top-side hook
57 Engaged portion
58 Outer peripheral step portion
59 Narrow clearance portion
60 back-side second fixing member
62 back-side hook
64 Inner peripheral step portion
80 Operational mounting member
82 Shaft portion
84 Operating knob portion
86 Expanding portion

INDUSTRIAL APPLICABILITY

The present invention relates to a mat fastener for preventing a mat disposed on a floor of a vehicle from moving, and provides a technique capable of preventing the possibility that a mat is dismounted even if locking by an operational mounting member is released.

The invention claimed is:

1. A mat fastener for preventing a mat disposed on a carpet provided on a vehicle body panel from moving, the mat fastener comprising:
    a first fixing member fixed to the carpet;
    a second fixing member fixed to the mat; and
    an operational mounting member configured to mount the second fixing member to the first fixing member,
    wherein the first fixing member comprises
        a supporting portion configured to support the operational mounting member, and
        an engaging portion configured to hold the second fixing member,
    wherein the second fixing member comprises
        a locked portion configured to be locked on the operational mounting member, and
        an engaged portion configured to be engaged with the engaging portion in a state where the second fixing member is mounted to the first fixing member,
    wherein the engaging portion comprises a first portion and a second portion having a width less than a width of the first portion,
    wherein, upon operation of the operational mounting member so as to lock the locked portion from a state where the engaged portion is yet to be engaged with the engaging portion, the second fixing member approaches the first fixing member to cause the second portion of the engaging portion to engage with the engaged portion, and
    wherein the engaging portion is configured to hold the second fixing member such that the second fixing member is inhibited from moving in a direction away from the first fixing member.

2. The mat fastener according to claim 1,
    wherein one of:
        the engaging portion comprises a rib portion and the engaged portion comprises a trench portion to which the rib portion is mounted, and a direction of mounting the rib portion to the trench portion is along a direction of mounting the second fixing member to the first fixing member; and the engaged portion comprises a rib portion and the engaging portion comprises a trench portion to which the rib portion is mounted, and a direction of mounting the rib portion to the trench portion is along a direction of mounting the second fixing member to the first fixing member.

3. The mat fastener according to claim 2,
wherein the supporting portion has a cylindrical shape,
wherein the second fixing member comprises a barrel portion formed to surround an outer periphery of the supporting portion,
wherein one of:
the engaging portion comprises the rib portion and the engaged portion comprises the trench portion to which the rib portion is mounted, and the rib portion protrudes in a radial direction and extends in an axial direction at the outer periphery of the supporting portion; and
the engaged portion comprises the rib portion and the engaging portion comprises the trench portion to which the rib portion is mounted, and the rib portion protrudes in a radial direction and extends in an axial direction at an inner periphery of the barrel portion.

4. The mat fastener according to claim 2,
wherein the supporting portion has a cylindrical shape,
wherein the second fixing member comprises a barrel portion formed to surround an outer periphery of the supporting portion,
wherein one of:
the engaged portion comprises the rib portion and the engaging portion comprises the trench portion to which the rib portion is mounted, and the trench portion is formed by a pair of raised portions extending in an axial direction at the outer periphery of the supporting portion; and
the engaging portion comprises the rib portion and the engaged portion comprises the trench portion to which the rib portion is mounted, and the trench portion is formed by a pair of raised portions extending in an axial direction at an inner periphery of the barrel portion.

5. The mat fastener according to claim 1,
wherein the engaging portion and the engaged portion are disposed at least at a rearward position of a vehicle further than the operational mounting member.

6. The mat fastener according to claim 1,
wherein the operational mounting member comprises
a shaft portion, and
an operating knob portion provided to one end of the shaft portion,
wherein the operational mounting member is configured to mount the second fixing member to the first fixing member by rotational operation of the operating knob portion,
wherein the supporting portion of the first fixing member rotatably supports the shaft portion,
wherein the second fixing member further comprises
a mounting hole having a shape corresponding to an outer periphery of the operating knob portion, and
a hole-rim portion provided to the mounting hole and formed to lock the operating knob portion by intersecting therewith as a result of inserting the operating knob portion into the mounting hole and thereafter rotating the operating knob portion, wherein at least one of a corner portion on a lower end of the operating knob portion and a corner portion on an upper end of the hole-rim portion comprises a guiding surface, and wherein, in a state where the operating knob portion is inserted into the mounting hole and where the engaged portion is yet to be brought into contact and yet to be engaged with the engaging portion, when the operating knob portion is rotated, the corner portion on the lower end of the operating knob portion and the corner portion on the upper end of the hole-rim portion are brought into contact with each other, and when the operating knob portion is further rotated, the operating knob portion and the hole-rim portion slide along the guiding surface to press the second fixing member toward the first fixing member.

7. The mat fastener according to claim 6,
wherein the supporting portion has a cylindrical shape,
wherein the second fixing member comprises a barrel portion formed to surround an outer periphery of the supporting portion,
wherein the engaging portion is provided to the outer periphery of the supporting portion, and
wherein the engaged portion is provided to an inner periphery of the barrel portion.

8. The mat fastener according to claim 1, wherein the engaged portion comprises a pair of arms including a first portion at which the pair arms are separated by a first distance, and a second portion at which the pair arms are separated a second distance less than the first distance.

9. The mat fastener according to claim 8, wherein, upon the operation of the operational mounting member, the second fixing member approaches the first fixing member to cause the second portion of the engaging portion to engage with second portion of the pair of arms of the engaged portion.

10. The mat fastener according to claim 8, wherein the first portion of the pair of arms of the engaged portion comprises a tapered portion at which the first distance gradually increases in a direction away from the locked portion.

11. The mat fastener according to claim 8, wherein the second fixing member comprises a barrel portion, the engaged portion being formed on an inner wall of the barrel portion such that the pair of arms are separated in a circumferential direction around the inner wall of the barrel portion.

12. The mat fastener according to claim 11, wherein the engaged portion comprises a first engaged portion and a second engaged portion which faces the first engaged portion across the barrel portion of the second fixing member.

13. The mat fastener according to claim 12, wherein the engaging portion comprises a first engaging portion and a second engaging portion which is formed opposite the first engaging portion on an outer periphery of the supporting portion, and
wherein the first and second engaging portions engage with the first and second engaged portions, respectively.

14. A mat fastener for preventing a mat disposed on a carpet provided on a vehicle body panel from moving, the mat fastener comprising:
a first fixing member fixed to the carpet;
a second fixing member fixed to the mat; and
an operational mounting member configured to mount the second fixing member to the first fixing member, wherein the first fixing member comprises
a supporting portion configured to support the operational mounting member and formed to have a cylindrical shape, and
an engaging portion configured to hold the second fixing member,
wherein the second fixing member comprises
a locked portion configured to be locked on the operational mounting member,
an engaged portion configured to be engaged with the engaging portion in a state where the second fixing member is mounted to the first fixing member, and
a barrel portion formed to surround an outer periphery of the supporting portion,
wherein one of:
the engaging portion comprises a rib portion and the engaged portion comprises a trench portion to which the rib portion is mounted:
the rib portion protruding in a radial direction and extending in an axial direction at the outer periphery of the supporting portion; and
the trench portion comprising a pair of raised portions extending in an axial direction at an inner periphery of the barrel portion; and the engaged portion comprises a rib portion and the engaging portion comprises a trench portion to which the rib portion is mounted:
the rib portion protruding in a radial direction and extending in an axial direction at an inner periphery of the barrel portion; and
the trench portion comprising a pair of raised portions extending in an axial direction at the outer periphery of the supporting portion, and
wherein a direction of mounting the rib portion to the trench portion is along a direction of mounting the second fixing member to the first fixing member.

15. The mat fastener according to claim 14, wherein the engaging portion comprises a first portion and a second portion having a width less than the first portion, and
wherein, upon operation of the operational mounting member so as to lock the locked portion from a state where the engaged portion is yet to be engaged with the engaging portion, the second fixing member approaches the first fixing member to cause the second portion of the engaging portion to engage with the engaged portion.

* * * * *